Aug. 11, 1936.  J. F. WALSH  2,050,402
BALL AND METHOD OF MAKING THE SAME
Filed April 11, 1930
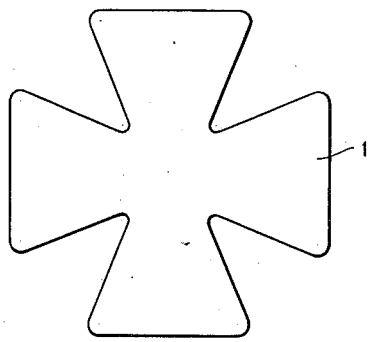
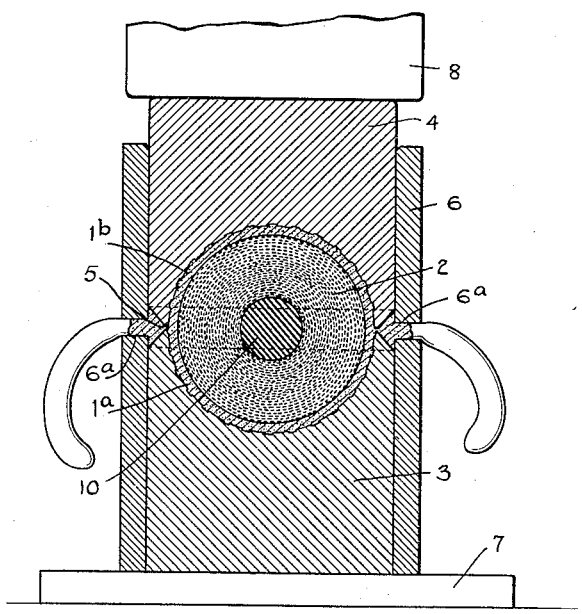
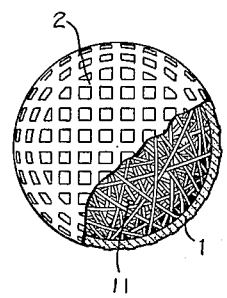
INVENTOR
James F. Walsh
BY
ATTORNEY Patented Aug. 11, 1936

2,050,402

UNITED STATES PATENT OFFICE 2,050,402

BALL AND METHOD OF MAKING THE SAME

James F. Walsh, South Orange, N. J., assignor to Celluloid Corporation, a corporation of New Jersey Application April 11, 1930, Serial No. 443,397

4 Claims. (Cl. 273—62)

This invention relates to playing balls and more particularly to golf balls having improved outer shells or casings of attractive coloration and low cost.

An object of my invention is to make balls, particularly golf balls, having a cover or outer casing that is relatively inexpensive, light and resilient.

Another object of my invention is to provide a cover or outer casing for balls which is of solid color and washable and therefore always bright and attractive. Other objects of my invention will appear from the following description.

Heretofore in the making of golf balls, the outer cover, layer or shell has been made of balata rubber. The use of balata rubber presents serious disadvantages, among which are high price and the fact that balata rubber is not inherently white, so that balls covered with the same must be painted with a white paint which easily wears off and causes the ball to assume a dirty appearance.

I have found that if a soft or pliable plastic composition containing cellulose acetate or other organic derivatives of cellulose is employed as the cover or casing for playing balls, particularly golf balls, many unexpected and important advantages accrue. Because of the high thermoplasticity of such plastic material, the same may be easily molded. An infinite range of color effects and configurations may be produced, and since the color of the pigment is disseminated throughout the mass of the plastic composition, the color effect is permanent and does not wear off when the original surface is worn. Such coatings are water-proof and washable and are non-inflammable or of slow-burning quality. They are very much cheaper than balata rubber coatings, are light and resilient. The plastic composition may be made of varying degrees of hardness and plasticity to suit the particular requirements, and they may be easily manipulated. Such coatings or casings may be easily lacquered, printed or embossed, if desired, and if a luminous ball is required, suitable luminescent salts may be incorporated in the plastic composition. Another important advantage of my invention is due to the fact that scrap material formed in the process may be reworked, thus minimizing waste.

In accordance with my invention I make a playing ball having a suitable relatively hard interior by providing the same with a cover or outer shell made of a soft or pliable composition containing cellulose acetate or other organic derivatives of cellulose.

While playing balls of any kind may be made in accordance with this invention, the greatest advantages accrue when golf balls are made. The interior of such golf balls may be made in any of the many ways now employed, an example of which is a central rubber core wound with rubber thread.

As stated, I provide the ball with a cover or outer shell containing a soft or pliable plastic composition containing cellulose acetate or other organic derivative of cellulose. Examples of other organic derivatives of cellulose are organic esters of cellulose such as cellulose formate, cellulose butyrate, cellulose propionate, or cellulose ethers such as ethyl cellulose, methyl cellulose or benzyl cellulose.

The plastic composition should be soft or pliable and to obtain this, suitable plasticizers or softening agents in relatively large amounts, preferably more than the weight of the cellulose acetate present, should be employed. Examples of such plasticizers are triphenyl phosphate, ortho- or para-ethyl toluene sulfonamid, triacetin, dibutyl tartrate, dimethyl phthalate, diethyl phthalate, etc. or any suitable mixtures of these.

The plastic composition also may contain pigments or effect materials. While generally a white pigment such as zinc oxide or titanium oxide is employed, other effect materials to produce pearl effect etc. may also be used.

The plastic composition containing the cellulose acetate may be applied to the ball in any form, but generally it is applied in the form of a sheet. The sheet may be made by kneading the required ingredients in the presence of volatile solvents or latent solvents at elevated temperatures, and the doughy mass thus formed rolled on heated rolls to further convert the same and to eliminate the volatile liquids. The slabs taken from the rolls may be placed in seasoning chambers kept at elevated temperatures to remove practically all of the solvents, and such slabs may then be cut into blanks to be employed in the process. If desired the sheets or slabs from the rolls may be stacked and pressed under elevated temperatures to form blocks and sheets then cut from such blocks. However the cheaper process of employing thin slabs taken directly from the rolls is preferred.

In applying the sheets of plastic material to the body of the ball, any suitable method may be employed. Merely by way of illustration, but without being restricted thereto, the following mode of application is described, reference being had to the accompanying drawing, wherein Figure 1 is a plan view of a blank cut from a sheet of the plastic material.

Figure 2 is a vertical cross-section showing diagrammatically the mode of assembling and pressing, and Figure 3 is an elevation, partly in section, of the finished golf ball.

If the sheet or slab is cold or stiff, it is slightly softened by heating, and blanks 1 are chopped or cut from the same, the blanks preferably having the shape of a German cross.

In making the ball, blank 1a of the plastic material is placed in a cavity of the lower half of the steel mold 3, and the ball 2 consisting of an inner rubber core wound with rubber thread is placed thereon. An upper blank 1b of the plastic material is placed over the ball and the upper member 4 of the mold is placed thereon. The two halves of the steel mold 3 and 4, when brought together, form a groove 5.

The assembly of the blanks of plastic material, the ball and the steel mold are then inserted into a cylindrical casing 6 provided with two small holes 6a. The mold is then placed in a press having steam-heated platens 7 and 8 kept at a temperature of about 300° F. Hydraulic pressure is then applied; say 500 lbs. for several minutes, then full pressure about 2,000 lbs. per square inch is applied for several more minutes or until molding is complete. The excess of plastic composition overflows through the groove 5 and the holes 6a. The mold is then chilled by passing cold water through the platens and a cool ball is removed mechanically from the mold.

As shown in Fig. 3, the finished ball 2 comprises the inner core 10, the rubber thread wrapping 11 and the outer shell 1 of plastic composition containing cellulose acetate, the surface of which has been embossed during the molding operation.

Often, in order to attain better adhesion between the plastic composition containing the cellulose acetate and the threads of the rubber, it is desirable to employ a suitable adhesive solution. This may be done by immersing the rubber ball in an adhesive solution. Such adhesive solutions are generally made by dissolving in volatile solvents resins that have great adhesive power, such as gum elemi, shellac, accaroid resins, or toluene sulfonamid-aldehyde condensation products. The solvents used are generally those that exhibit solvent action towards cellulose acetate, such as acetone, methyl ether of ethylene glycol, ethyl lactate, etc. The filling of the intersticial spaces of the rubber windings by any easily flowable and adhering plastic materials is essential for a good bond.

In order further to illustrate my invention but without being limited thereto, the following specific examples of compositions that may be employed are given.

*Example I*

A satisfactory formula for making the plastic sheets to be used as the cover for the ball is the following:

| | Parts by weight |
|---|---|
| Cellulose acetate | 100 |
| Triphenyl phosphate | 15 |
| Paraethyl toluene sulfonamid | 40 |
| Triacetin | 30 |
| Dibutyl tartrate | 40 |
| Titanium oxide | 10 |
| Ultra marine blue | 0.007 |

The above ingredients are soaked in a kneader using a solvent mixture consisting of about 100 parts total of acetone, ethyl acetate and alcohol in equal quantities. The plastic mass is then worked up on warm malaxating or converting rolls as in celluloid practice. Owing to its high plasticity, the stock can be rolled almost to constant weight or until practically all of the solvents are eliminated. However, the slabs taken from the rolls, generally measuring about $\frac{3}{32}$ of an inch in thickness are placed in seasoning chambers kept at temperatures of 110° F. to 120° F. to remove practically all of the residual solvents. This step in seasoning insures the absence of any blisters forming during the molding operations. The rough surface slabs thus dried are ready to be used for making the balls. Of course cake pressing and subsequent sheeting as in celluloid practice is also possible, but I prefer to use the cheaper process of taking thin slabs directly from the rolls.

*Example II*

Another formula which has also given satisfactory results is made as follows:

| | Parts by weight |
|---|---|
| Cellulose acetate | 100 |
| Dimethyl phthalate | 70 ⎱ 130 |
| Mixture of ortho and paratoluenesulfonamid | 60 ⎰ parts |

The soaking solvents in this case can be acetone 40 parts and methyl alcohol 60 parts. The pigment and coloring matter can vary depending upon the density and color wanted. If desired, I may incorporate other plasticizers in my formula such as mono methyl xylene sulfonamid, essential oils, etc.

*Example III*

As stated before, the waste that accumulates in this process can be reworked on the rolls into slab form. As this material is ordinarily soiled by dirt specks, etc., it is advisable to lacquer balls made from such waste products. For lacquering, any suitable adhesive coating may be employed whether it is made with nitrocellulose, cellulose acetate, varnish, enamels, etc. The choice here is too broad to specify any particular formula. A suitable lacquer for such purposes is made up as follows:

| | Parts by weight |
|---|---|
| Cellulose acetate | 100 |
| Dimethyl phthalate | 35 |
| Ethylated toluene sulfonamid | 35 |
| Titanium oxide | 50 |
| Ultra marine blue | 0.5 |
| Solvents | 700 |
|    Methyl ether of ethylene glycol | 10 |
|    The acetate of ethyl ether of ethylene glycol | 10 |
|    Denatured alcohol | 30 |
|    Diacetone alcohol | 60 |

It is important in the lacquer that the coating shows the same consistency when dry as the casing itself. Hardness and brittleness is to be avoided in the coating as the ball is subjected to much abuse. Plain linseed oil paints ordinarily lack proper adhesion unless suitable gums and solvents are added.

It is to be understood that the foregoing examples are given merely by way of illustration and that many variations may be made therein without departing from the spirit of my invention.

Having described my invention, what I desire to secured by Letters Patent is:

1. A golf ball having an outer shell containing as its major constituents cellulose acetate and a plasticizer, the latter in amount greater than the cellulose acetate.

2. A golf ball having an inner portion of rubber and an outer shell containing as its major constituents cellulose acetate and a plasticizer, the latter in amount greater than that of the cellulose acetate, and an intermediate film of an adhesive.

3. A golf ball having an outer shell containing cellulose acetate and a plasticizer, the cellulose acetate and plasticizer being present in the proportion of 100 parts of cellulose acetate to 130 parts of plasticizer.

4. A golf ball having an outer shell containing 100 parts of cellulose acetate, 70 parts of dimethyl phthalate and 60 parts of a mixture of ortho- and para-toluene sulfonamid.

JAMES F. WALSH.